United States Patent
Axe et al.

(10) Patent No.: US 8,239,263 B2
(45) Date of Patent: Aug. 7, 2012

(54) IDENTIFYING AND/OR BLOCKING ADS SUCH AS DOCUMENT-SPECIFIC COMPETITIVE ADS

(75) Inventors: Brian Axe, San Francisco, CA (US); Rama Ranganath, Mountain View, CA (US); Narayanan Shivakumar, San Jose, CA (US)

(73) Assignee: Google Inc., Mountain View, CA (US)

( * ) Notice: Subject to any disclaimer, the term of this patent is extended or adjusted under 35 U.S.C. 154(b) by 1262 days.

(21) Appl. No.: 10/656,917

(22) Filed: Sep. 5, 2003

(65) Prior Publication Data

US 2005/0055271 A1 Mar. 10, 2005

(51) Int. Cl.
*G06Q 30/00* (2006.01)
(52) U.S. Cl. ................................................ 705/14.4
(58) Field of Classification Search .............. 705/14
See application file for complete search history.

(56) References Cited

U.S. PATENT DOCUMENTS

| | | | |
|---|---|---|---|
| 5,724,521 A * | 3/1998 | Dedrick ................ | 705/26.1 |
| 5,740,549 A | 4/1998 | Reilly et al. | |
| 5,794,210 A | 8/1998 | Goldhaber et al. | |
| 5,848,396 A | 12/1998 | Gerace | |
| 5,848,397 A | 12/1998 | Marsh et al. | |
| 5,948,061 A | 9/1999 | Merriman | |
| 6,026,368 A | 2/2000 | Brown et al. | |
| 6,044,376 A | 3/2000 | Kurtzman, II | |
| 6,078,914 A | 6/2000 | Redfern | |
| 6,144,944 A | 11/2000 | Kurtzman, II et al. | |
| 6,167,382 A | 12/2000 | Sparks et al. | |
| 6,269,361 B1 | 7/2001 | Davis et al. | |
| 6,401,075 B1 | 6/2002 | Mason et al. | |
| 6,460,034 B1 | 10/2002 | Wical | |
| 6,513,027 B1 | 1/2003 | Powers et al. | |
| 6,799,326 B2 * | 9/2004 | Boylan et al. ............... | 725/35 |
| 6,985,882 B1 | 1/2006 | Del Sesto | |
| 7,039,599 B2 | 5/2006 | Merriman | |
| 7,136,875 B2 | 11/2006 | Anderson et al. | |
| 2001/0047297 A1 * | 11/2001 | Wen ............................... | 705/14 |
| 2002/0038299 A1 | 3/2002 | Zernik et al. | |
| 2002/0054035 A1 | 5/2002 | Nitta | |
| 2002/0188946 A1 | 12/2002 | Kohne | |

FOREIGN PATENT DOCUMENTS

KR 2002-60440 7/2002

(Continued)

OTHER PUBLICATIONS

Bangalore, Srinivas and Rambow, Owen, Exploiting a Probabilistic Hierarchical Model for Generation, Aug. 2000, Proceedings of the 18th International Conference on Computation Linguistics (COLING 2000).*

(Continued)

*Primary Examiner* — Namrata Boveja
*Assistant Examiner* — Alvin L Brown
(74) *Attorney, Agent, or Firm* — Fish & Richardson P.C.

(57) ABSTRACT

A content owner partner (e.g., a Website/Web page publisher) can easily block entire broad or narrow categories of ads, and can specify objectionable ad content or targeting. Concepts may be associated with a property and ads related to those concepts may be blocked for the given property. Further, terms may be associated with a property and ads including any of the terms may be blocked for the given property.

62 Claims, 10 Drawing Sheets

FOREIGN PATENT DOCUMENTS

| | | |
|---|---|---|
| KR | 2003-44189 | 6/2003 |
| KR | 2003-63275 | 7/2003 |
| WO | WO 97/21183 | 6/1997 |
| WO | WO0002380 A3 | 3/2000 |

OTHER PUBLICATIONS

Form PCT/IB/326, Notification Concerning Transmittal of International Preliminary Report on Patentability (Chapter I of the Patent Cooperation Treaty) for PCT/US2004/027390, mailed May 26, 2006 (1 pg.).
Form PCT/IB/373, International Preliminary Report on Patentability for PCT/US2004/027390, mailed May 26, 2006 (1 pg.).
Form PCT/ISA/237, Written Opinion of the International Searching Authority for PCT/US2004/27390, mailed Apr. 18, 2006 (3 pgs.).
Form PCT/IB/311, Notification Concerning Transmittal of International Application as Published or Republished for PCT/US2004/027390, mailed Jun. 1, 2006 with attached publication No. WO 2005/025291 and Form PCT/ISA/210 (mailed Apr. 18, 2006) (3 pgs.).
Notice of the Preliminary Rejection dated Aug. 27, 2007.
English translation of the Notice of the Preliminary Rejection dated Aug. 27, 2007.
95/001,073, Reexamination of Stone et al, filed Sep. 30, 2004
95/001,061, Reexamination of Stone et al, filed Sep. 3, 2002.
95/001,069, Reexamination of Dean et al, filed Jul. 11, 2002.
95/001,068, Reexamination of Stone et al, filed Dec. 7, 2002.
AdForce, Inc., A Complete Guide to AdForce, Version 2.6, 1998.
AdForce, Inc., S-1/A SEC Filing, May 6, 1999.
AdKnowledge Campaign Manager: Reviewer's Guide, AdKnowledge, Aug. 1998.
AdKnowledge Market Match Planner: Reviewer's Guide, AdKnowledge, May 1998.
Ad-Star.com website archive from www. Archive.org, Apr. 12, 1997 and Feb. 1, 1997.
Baseview Products, Inc., AdManagerPro Administration Manual v. 2.0, Dec. 1998.
Baseview Products, Inc., ClassManagerPro Administration Manual v. 1.0.5, Feb. 1, 1997.
Business Wire, "Global Network, Inc. Enters Into Agreement in Principle With Major Advertising Agency," Oct. 4, 1999.
Information Access Technologies, Inc., Aaddzz brochure, "The Best Way to Buy and Sell Web Advertising Space," © 1997.
Information Access Technologies, Inc., Aaddzz.com website archive from www. Archive.org, archived on Jan. 30, 1998.
Zeff, R. et al., Advertising on the Internet, 2nd Ed., John Wiley & Sons, 1999.
Dedrick, R., Interactive Electronic Advertising, IEEE, 1994.
Dedrick, R., A Consumption Model for Targeted Electronic Advertising, Intel Architecture Labs, IEEE, 1995.
Request for Reexamination of U.S. Patent No. 7,240,025 B2, Control No. 95/001,073.
Request for Reexamination of U.S. Patent No. 6,446,045 B1, Control No. 95/001,061.
Request for Reexamination of U.S. Patent No. 7,249,059 B2, Control No. 95/001,069.
Request for Reexamination of U.S. Patent No. 6,829,587 B2, Control No. 95/001,068.
Office Action for corresponding Canadian Application No. 2,537,537, mailed Jan. 29, 2010.
Office Action from corresponding Canadian Application No. 2,537,537, dated Jan. 27, 2011.
Office Action from corresponding Canadian Application No. 2,537,537, dated Dec. 19, 2011.

* cited by examiner

IDENTIFYING AND/OR BLOCKING ADS SUCH AS DOCUMENT-SPECIFIC COMPETITIVE ADS

§1. BACKGROUND OF THE INVENTION

§1.1 Field of the Invention

The present invention concerns advertising. In particular, the present invention concerns improving content-targeted advertising.

§1.2 Related Art

Advertising using traditional media, such as television, radio, newspapers and magazines, is well known. Unfortunately, even when armed with demographic studies and entirely reasonable assumptions about the typical audience of various media outlets, advertisers recognize that much of their ad budget is simply wasted. Moreover, it is very difficult to identify and eliminate such waste.

Recently, advertising over more interactive media has become popular. For example, as the number of people using the Internet has exploded, advertisers have come to appreciate media and services offered over the Internet as a potentially powerful way to advertise.

Advertisers have developed several strategies in an attempt to maximize the value of such advertising. In one strategy, advertisers use popular presences or means for providing interactive media or services (referred to as "Websites" in the specification without loss of generality) as conduits to reach a large audience. Using this first approach, an advertiser may place ads on the home page of the New York Times Website, or the USA Today Website, for example. In another strategy, an advertiser may attempt to target its ads to more narrow niche audiences, thereby increasing the likelihood of a positive response by the audience. For example, an agency promoting tourism in the Costa Rican rainforest might place ads on the ecotourism-travel subdirectory of the Yahoo Website. An advertiser will normally determine such targeting manually.

Regardless of the strategy, Website-based ads (also referred to as "Web ads") are often presented to their advertising audience in the form of "banner ads"—i.e., a rectangular box that includes graphic components. When a member of the advertising audience (referred to as a "viewer" or "user" in the Specification without loss of generality) selects one of these banner ads by clicking on it, embedded hypertext links typically direct the viewer to the advertiser's Website. This process, wherein the viewer selects an ad, is commonly referred to as a "click-through" ("Click-through" is intended to cover any user selection.). The ratio of the number of click-throughs to the number of impressions of the ad (i.e., the number of times an ad is displayed or otherwise rendered) is commonly referred to as the "click-through rate" or "CTR" of the ad.

A "conversion" is said to occur when a user consummates a transaction related to a previously served ad. What constitutes a conversion may vary from case to case and can be determined in a variety of ways. For example, it may be the case that a conversion occurs when a user clicks on an ad, is referred to the advertiser's Web page, and consummates a purchase there before leaving that Web page. Alternatively, a conversion may be defined as a user being shown an ad, and making a purchase on the advertiser's Web page within a predetermined time (e.g., seven days). In yet another alternative, a conversion may be defined by an advertiser to be any measurable/observable user action such as, for example, downloading a white paper, navigating to at least a given depth of a Website, viewing at least a certain number of Web pages, spending at least a predetermined amount of time on a Website or Web page, etc. Often, if user actions don't indicate a consummated purchase, they may indicate a sales lead, although user actions constituting a conversion are not limited to this. Indeed, many other definitions of what constitutes a conversion are possible. The ratio of the number of conversions to the number of impressions of the ad (i.e., the number of times an ad is displayed or otherwise rendered) is commonly referred to as the conversion rate. If a conversion is defined to be able to occur within a predetermined time since the serving of an ad, one possible definition of the conversion rate might only consider ads that have been served more than the predetermined time in the past.

The hosts of Websites on which the ads are presented (referred to as "Website hosts" or "ad consumers") have the challenge of maximizing ad revenue without impairing their users' experience. Some Website hosts have chosen to place advertising revenues over the interests of users. One such Website is "Overture.com," which hosts a so-called "search engine" service returning advertisements masquerading as "search results" in response to user queries. The Overture.com Website permits advertisers to pay to position an ad for their Website (or a target Website) higher up on the list of purported search results. If such schemes where the advertiser only pays if a user clicks on the ad (i.e., cost-per-click) are implemented, the advertiser lacks incentive to target their ads effectively, since a poorly targeted ad will not be clicked and therefore will not require payment. Consequently, high cost-per-click ads show up near or at the top, but do not necessarily translate into real revenue for the ad publisher because viewers don't click on them. Furthermore, ads that viewers would click on are further down the list, or not on the list at all, and so relevancy of ads is compromised.

Search engines, such as Google for example, have enabled advertisers to target their ads so that they will be rendered in conjunction with a search results page responsive to a query that is relevant, presumably, to the ad. The Google system tracks click-through statistics (which is a performance parameter) for ads and keywords. Given a search keyword, there are a limited number of keyword targeted ads that could be shown, leading to a relatively manageable problem space. Although search result pages afford advertisers a great opportunity to target their ads to a more receptive audience, search result pages are merely a fraction of page views of the World Wide Web.

Some online advertising systems may use ad relevance information and document content relevance information (e.g., concepts or topics, feature vectors, etc.) to "match" ads to (and/or to score ads with respect to) a document including content, such as a Web page for example. Examples of such online advertising systems are described in:

U.S. Provisional Application Ser. No. 60/413,536 (incorporated herein by reference), entitled "METHODS AND APPARATUS FOR SERVING RELEVANT ADVERTISEMENTS," filed on Sep. 24, 2002 and listing Jeffrey A. Dean, Georges R. Harik and Paul Bucheit as inventors;

U.S. patent application Ser. No. 10/314,427 (incorporated herein by reference), entitled "METHODS AND APPARATUS FOR SERVING RELEVANT ADVERTISEMENTS," filed on Dec. 6, 2002 and listing Jeffrey A. Dean, Georges R. Harik and Paul Bucheit as inventors;

U.S. patent application Ser. No. 10/375,900 (incorporated herein by reference), entitled "SERVING ADVERTISEMENTS BASED ON CONTENT," filed on Feb. 26, 2003 and listing Darrell Anderson, Paul Bucheit, Alex Carobus, Claire Cui, Jeffrey A. Dean, Georges R. Harik, Deepak Jindal, and Narayanan Shivakumar as inventors; and U.S. patent application Ser. No. 10/452,830 (incorporated herein by reference), entitled "SERVING ADVERTISEMENTS USING INFORMATION ASSOCIATED WITH E-MAIL," filed on Jun. 2, 2003 and listing Jeffrey A. Dean, Georges R. Harik and Paul Bucheit as inventors.

Generally, such online advertising systems may use relevance information of both candidate advertisements and a document to determine a score of each ad relative to the document. The score may be used to determine whether or not to serve an ad in association with the document (also referred to as eligibility determinations), and/or to determine a relative attribute (e.g., screen position, size, etc.) of one or more ads to be served in association with the document. The determination of the score may also use, for example, one or more of (1) one or more performance parameters (e.g., click-through rate, conversion rate, user ratings, etc.) of the ad, (2) quality information about an advertiser associated with the ad, and (3) price information (e.g., a maximum price per result (e.g., per click, per conversion, per impression, etc.)) associated with the ad.

Many content owners (e.g., publishers of Web pages) who sell ad inventory on their Websites (or otherwise agree to have ads rendered on their Websites) do not want to display ads that compete with their product offerings. Some content owners have existing exclusive relationships with advertisers. Such content owners either do not want to display, or are contractually prohibited from displaying, ads that compete with their exclusive partner's product offerings. For example, a Website selling auto insurance may not want to show ads with links to other Websites selling auto insurance. Similarly, a Website with content related to flowers may have an exclusive relationship with a flower delivery company to show only its ads for flower delivery.

Some ad serving systems offer a URL-based or domain-based (e.g., Website based) ad blocking. In such systems, a block list includes URLs and/or Website home pages. Ads may include a visible URL or a link to a URL. If an ad includes a visible URL or a link to a URL that is on the block list associated with a particular Web page, it is not served with that Web page. Unfortunately, generating block lists often entails a highly manual process of generating related keywords and searching on those keywords to identify ads that should be blocked. Further, managing such block lists becomes difficult as new ads for new Web pages or Websites are added. Otherwise, the block list will not block new ads entered after the initial creation of the block list. Finally, block lists are often over-inclusive. For example, all ads on superstores like Amazon might be blocked when only a product category needs to be blocked. Thus, potential advertising revenue is lost.

Some ad serving systems, particularly those that serve ads targeted to terms of a search query, allow content owners to use a list of keywords, commonly referred to as "black lists," to black out ads or block ads for a set of search terms competitive to the content owner or its exclusive partner. For example, America Online might want to block out ads targeted to the keyword "ISP." Unfortunately, black lists do not work very well for content-based ad targeting since a Web page may be associated with multiple categories. Instead of eliminating all ads targeted to black listed keywords (e.g., flowers, roses, tulips, carnations, bouquet, baby's breath, . . . , or 1800access, USWest, Juno Online, . . . ), which entails an extensive list of keywords, it's best to just eliminate the ads for the offending category (e.g., flowers, or Internet service providers) and show other related ads. Thus, black lists have the problem of requiring manually generating a set of keywords pertaining to a category. Since these lists are often under-inclusive, particularly if they are not updated regularly, undesirable ads may be served on a content owner's document, resulting in lost good will. Indeed, this problem is more apparent content-based ad targeting partners than search-based keyword targeting partners, since ad slippage (i.e., the rendering of an ad that should be blocked) is visible on high traffic pages of a content site as opposed to ad slippage on an esoteric search results page. Further, without careful consideration, a black list may be over-inclusive and block ads with an objectionable keyword but in an adjacent category. For example, it may be desired to block ads for Sony consumer electronics, but if "Sony" is added to the blacklist, ads for Sony DVDs may be inadvertently blocked.

In view of the foregoing, there is a need for better ad blocking techniques. Such techniques should meet one or more of the following goals: (i) be easy to set up; (ii) be easy to manage; (iii) avoid under-inclusion; (iv) avoid over-inclusion; and (v) work with content-targeted ad serving systems.

§2. SUMMARY OF THE INVENTION

The present invention enables a content owner partner (e.g., a Website/Web page publisher) to easily block entire broad or narrow categories of ads, and to specify objectionable ad content or targeting. The present invention may do so by associating concepts with a property and blocking ads related to those concepts for the given property, and/or associating terms with a property and blocking ads including any of the terms for the given property.

§3. BRIEF DESCRIPTION OF THE DRAWINGS

§4. DETAILED DESCRIPTION

The present invention may involve novel methods, apparatus, message formats and/or data structures for improving ad blocking, such as ad blocking for use with a content-targeted ad serving system. The following description is presented to enable one skilled in the art to make and use the invention, and is provided in the context of particular applications and their requirements. Various modifications to the disclosed embodiments will be apparent to those skilled in the art, and the general principles set forth below may be applied to other embodiments and applications. Thus, the present invention is not intended to be limited to the embodiments shown and the inventors regard their invention as any patentable subject matter described.

In the following, environments in which, or with which, the present invention may operate are described in §4.1. Then, exemplary embodiments of the present invention are described in §4.2. Illustrative operations of exemplary embodiments of the present invention are then provided in §4.3. Finally, some conclusions regarding the present invention are set forth in §4.4.

§4.1 Environments in which, or with which, the Present Invention may Operate

§4.1.1 Exemplary Advertising Environment

Figure 1:
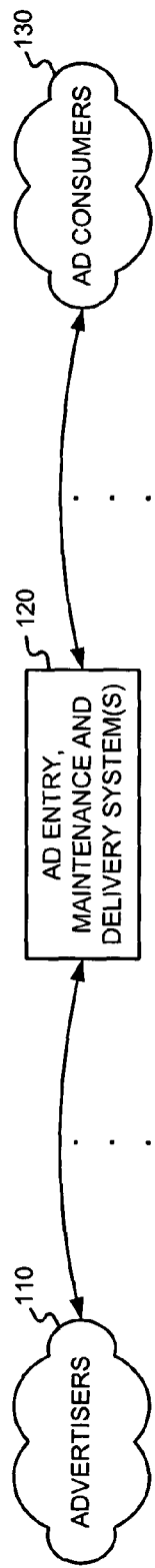
FIG. 1 is a high-level diagram showing parties or entities that can interact with an advertising system.

FIG. 1 is a high level diagram of an advertising environment. The environment may include an ad entry, maintenance and delivery system (simply referred to an ad server) 120. Advertisers 110 may directly, or indirectly, enter, maintain, and track ad information in the system 120. The ads may be in the form of graphical ads such as so-called banner ads, text only ads, image ads, audio ads, video ads, ads combining one of more of any of such components, etc. The ads may also include embedded information, such as a link, and/or machine executable instructions. Ad consumers 130 may submit requests for ads to, accept ads responsive to their request from, and provide usage information to, the system 120. An entity other than an ad consumer 130 may initiate a request for ads. Although not shown, other entities may provide usage information (e.g., whether or not a conversion or click-through related to the ad occurred) to the system 120. This usage information may include measured or observed user behavior related to ads that have been served.

Figure 2:
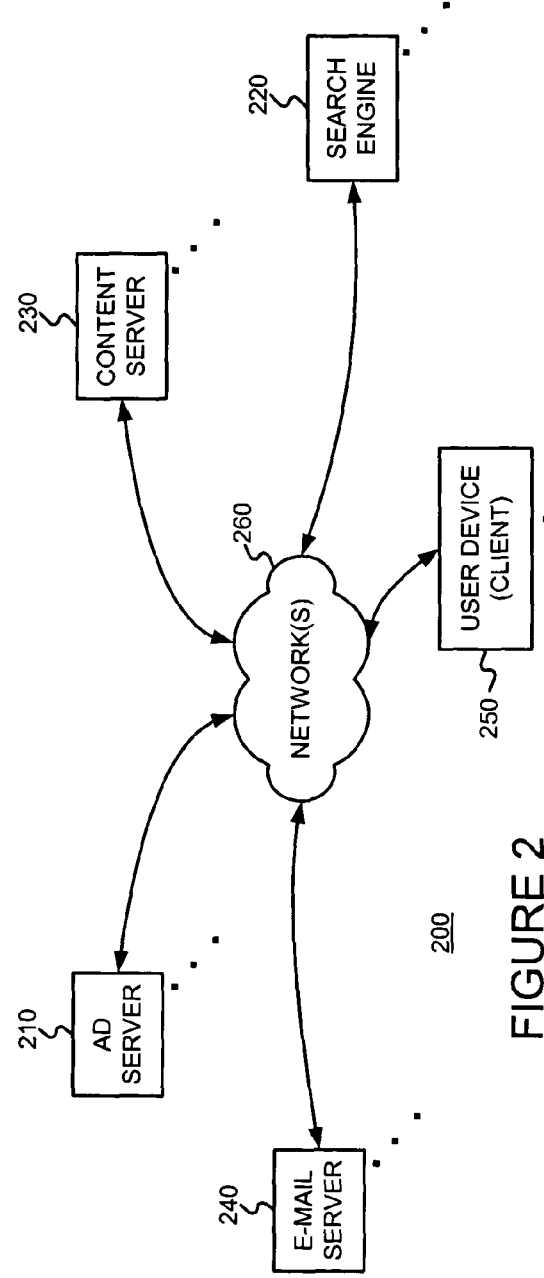
FIG. 2 is a diagram illustrating an environment in which, or with which, the present invention may operate.

The ad server 120 may be similar to the one described in FIG. 2 of U.S. patent application Ser. No. 10/375,900, mentioned in §1.2 above. An advertising program may include information concerning accounts, campaigns, creatives, targeting, etc. The term "account" relates to information for a given advertiser (e.g., a unique e-mail address, a password, billing information, etc.). A "campaign" or "ad campaign" refers to one or more groups of one or more advertisements, and may include a start date, an end date, budget information, geo-targeting information, syndication information, etc. For example, Honda may have one advertising campaign for its automotive line, and a separate advertising campaign for its motorcycle line. The campaign for its automotive line have one or more ad groups, each containing one or more ads. Each ad group may include targeting information (e.g., a set of keywords, a set of one or more topics, etc.), and price information (e.g., maximum cost (cost per click-though, cost per conversion, etc.)). Alternatively, or in addition, each ad group may include an average cost (e.g., average cost per click-through, average cost per conversion, etc.). Therefore, a single maximum cost and/or a single average cost may be associated with one or more keywords, and/or topics. As stated, each ad group may have one or more ads or "creatives" (That is, ad content that is ultimately rendered to an end user.). Each ad may also include a link to a URL (e.g., a landing Web page, such as the home page of an advertiser, or a Web page associated with a particular product or server). Naturally, the ad information may include more or less information, and may be organized in a number of different ways.

FIG. 2 illustrates an environment 200 in which the present invention may be used. A user device (also referred to as a "client" or "client device") 250 may include a browser facility (such as the Explorer browser from Microsoft, the Opera Web Browser from Opera Software of Norway, the Navigator browser from AOL/Time Warner, etc.), an e-mail facility (e.g., Outlook from Microsoft), etc. A search engine 220 may permit user devices 250 to search collections of documents (e.g., Web pages). A content server 210 may permit user devices 250 to access documents. An e-mail server (such as Hotmail from Microsoft Network, Yahoo Mail, etc.) 240 may be used to provide e-mail functionality to user devices 250. An ad server 210 may be used to serve ads to user devices 250. The ads may be served in association with search results provided by the search engine 220. However, more relevant to the present invention, content-relevant ads may be served in association with content provided by the content server 230, and/or e-mail supported by the e-mail server 240 and/or user device e-mail facilities.

As discussed in U.S. patent application Ser. No. 10/375, 900 (introduced above), ads may be targeted to documents served by content servers. Thus, one example of an ad consumer 130 is a general content server 230 that receives requests for documents (e.g., articles, discussion threads, music, video, graphics, search results, Web page listings, etc.), and retrieves the requested document in response to, or otherwise services, the request. The content server may submit a request for ads to the ad server 120/210. Such an ad request may include a number of ads desired. The ad request may also include document request information. This information may include the document itself (e.g., page), a category or topic corresponding to the content of the document or the document request (e.g., arts, business, computers, arts-movies, arts-music, etc.), part or all of the document request, content age, content type (e.g., text, graphics, video, audio, mixed media, etc.), geo-location information, document information, etc.

The content server 230 may combine the requested document with one or more of the advertisements provided by the ad server 120/210. This combined information including the document content and advertisement(s) is then forwarded towards the end user device 250 that requested the document, for presentation to the user. Finally, the content server 230 may transmit information about the ads and how, when, and/or where the ads are to be rendered (e.g., position, click-through or not, impression time, impression date, size, conversion or not, etc.) back to the ad server 120/210. Alternatively, or in addition, such information may be provided back to the ad server 120/210 by some other means.

Another example of an ad consumer 130 is the search engine 220. A search engine 220 may receive queries for search results. In response, the search engine may retrieve relevant search results (e.g., from an index of Web pages). An exemplary search engine is described in the article S. Brin and L. Page, "The Anatomy of a Large-Scale Hypertextual Search Engine," *Seventh International World Wide Web Conference*, Brisbane, Australia and in U.S. Pat. No. 6,285,999 (both incorporated herein by reference). Such search results may include, for example, lists of Web page titles, snippets of text extracted from those Web pages, and hypertext links to those Web pages, and may be grouped into a predetermined number of (e.g., ten) search results.

The search engine 220 may submit a request for ads to the ad server 120/210. The request may include a number of ads desired. This number may depend on the search results, the amount of screen or page space occupied by the search results, the size and shape of the ads, etc. In one embodiment, the number of desired ads will be from one to ten, and preferably from three to five. The request for ads may also include the query (as entered or parsed), information based on the query (such as geolocation information, whether the query came from an affiliate and an identifier of such an affiliate), and/or information associated with, or based on, the search results. Such information may include, for example, identifiers related to the search results (e.g., document identifiers or "docIDs"), scores related to the search results (e.g., information retrieval ("IR") scores such as dot products of feature vectors corresponding to a query and a document, Page Rank scores, and/or combinations of IR scores and Page Rank scores), snippets of text extracted from identified documents (e.g., Web pages), full text of identified documents, topics of identified documents, feature vectors of identified documents, etc.

The search engine 220 may combine the search results with one or more of the advertisements provided by the ad server 120/210. This combined information including the search results and advertisement(s) is then forwarded towards the user that submitted the search, for presentation to the user. Preferably, the search results are maintained as distinct from the ads, so as not to confuse the user between paid advertisements and presumably neutral search results.

Finally, the search engine 220 may transmit information about the ad and when, where, and/or how the ad was to be rendered (e.g., position, click-through or not, impression time, impression date, size, conversion or not, etc.) back to the ad server 120/210. Alternatively, or in addition, such information may be provided back to the ad server 120/210 by some other means.

Finally, the e-mail server 240 may be thought of, generally, as a content server in which a document served is simply an e-mail. Further, e-mail applications (such as Microsoft Outlook for example) may be used to send and/or receive e-mail. Therefore, an e-mail server 240 or application may be thought of as an ad consumer 130. Thus, e-mails may be thought of as documents, and targeted ads may be served in association with such documents. For example, one or more ads may be served in, under over, or otherwise in association with an e-mail.

Although the foregoing examples described servers as (i) requesting ads, and (ii) combining them with content, one or both of these operations may be performed by a client device (such as an end user computer for example).

§4.1.2 Definitions

Online ads, such as those used in the exemplary systems described above with reference to FIGS. 1 and 2, or any other system, may have various intrinsic features. Such features may be specified by an application and/or an advertiser. These features are referred to as "ad features" below. For example, in the case of a text ad, ad features may include a title line, ad text, and an embedded link. In the case of an image ad, ad features may include images, executable code, and an embedded link. Depending on the type of online ad, ad features may include one or more of the following: text, a link, an audio file, a video file, an image file, executable code, embedded information, etc.

When an online ad is served, one or more parameters may be used to describe how, when, and/or where the ad was served. These parameters are referred to as "serving parameters" below. Serving parameters may include, for example, one or more of the following: features of (including information on) a page on which the ad was served, a search query or search results associated with the serving of the ad, a user characteristic (e.g., their geographic location, the language used by the user, the type of browser used, previous page views, previous behavior), a host or affiliate site (e.g., America Online, Google, Yahoo) that initiated the request, an absolute position of the ad on the page on which it was served, a position (spatial or temporal) of the ad relative to other ads served, an absolute size of the ad, a size of the ad relative to other ads, a color of the ad, a number of other ads served, types of other ads served, time of day served, time of week served, time of year served, etc. Naturally, there are other serving parameters that may be used in the context of the invention.

Although serving parameters may be extrinsic to ad features, they may be associated with an ad as serving conditions or constraints. When used as serving conditions or constraints, such serving parameters are referred to simply as "serving constraints" (or "targeting criteria"). For example, in some systems, an advertiser may be able to target the serving of its ad by specifying that it is only to be served on weekdays, no lower than a certain position, only to users in a certain location, etc. As another example, in some systems, an advertiser may specify that its ad is to be served only if a page or search query includes certain keywords or phrases. As yet another example, in some systems, an advertiser may specify that its ad is to be served only if a document being served includes certain topics or concepts, or falls under a particular cluster or clusters, or some other classification or classifications.

"Ad information" may include any combination of ad features, ad serving constraints, information derivable from ad features or ad serving constraints (referred to as "ad derived information"), and/or information related to the ad (referred to as "ad related information"), as well as an extension of such information (e.g., information derived from ad related information).

A "document" is to be broadly interpreted to include any machine-readable and machine-storable work product. A document may be a file, a combination of files, one or more files with embedded links to other files, etc. The files may be of any type, such as text, audio, image, video, etc. Parts of a document to be rendered to an end user can be thought of as "content" of the document. A document may include "structured data" containing both content (words, pictures, etc.) and some indication of the meaning of that content (for example, e-mail fields and associated data, HTML tags and associated data, etc.) Ad spots in the document may be defined by embedded information or instructions. In the context of the Internet, a common document is a Web page. Web pages often include content and may include embedded information (such as meta information, hyperlinks, etc.) and/or embedded instructions (such as Javascript, etc.). In many cases, a document has a unique, addressable, storage location and can therefore be uniquely identified by this addressable location. A universal resource locator (URL) is a unique address used to access information on the Internet.

"Document information" may include any information included in the document, information derivable from information included in the document (referred to as "document derived information"), and/or information related to the document (referred to as "document related information"), as well as an extensions of such information (e.g., information derived from related information). An example of document derived information is a classification based on textual content of a document. Examples of document related information include document information from other documents with links to the instant document, as well as document information from other documents to which the instant document links.

Content from a document may be rendered on a "content rendering application or device". Examples of content rendering applications include an Internet browser (e.g., Explorer or Netscape), a media player (e.g., an MP3 player, a Realnetworks streaming audio file player, etc.), a viewer (e.g., an Abobe Acrobat pdf reader), etc.

A "content owner" is a person or entity that has some property right in the content of a document. A content owner may be an author of the content. In addition, or alternatively, a content owner may have rights to reproduce the content, rights to prepare derivative works of the content, rights to display or perform the content publicly, and/or other proscribed rights in the content. Although a content server might be a content owner in the content of the documents it serves, this is not necessary.

"User information" may include user behavior information and/or user profile information.

"E-mail information" may include any information included in an e-mail (also referred to as "internal e-mail information"), information derivable from information included in the e-mail and/or information related to the e-mail, as well as extensions of such information (e.g., information derived from related information). An example of information derived from e-mail information is information extracted or otherwise derived from search results returned in response to a search query composed of terms extracted from an e-mail subject line. Examples of information related to e-mail information include e-mail information about one or more other e-mails sent by the same sender of a given e-mail, or user information about an e-mail recipient. Information derived from or related to e-mail information may be referred to as "external e-mail information."

Various exemplary embodiments of the present invention are now described in §4.2.

§4.2 Exemplary Embodiments

Two different implementations of the present invention are described below. In the first, broad ad blocking is applied after an initial set of content-relevant ads is determined. In the second, broad ad blocking is used to affect an initial determination of a set of content-relevant ads.

Figure 3:
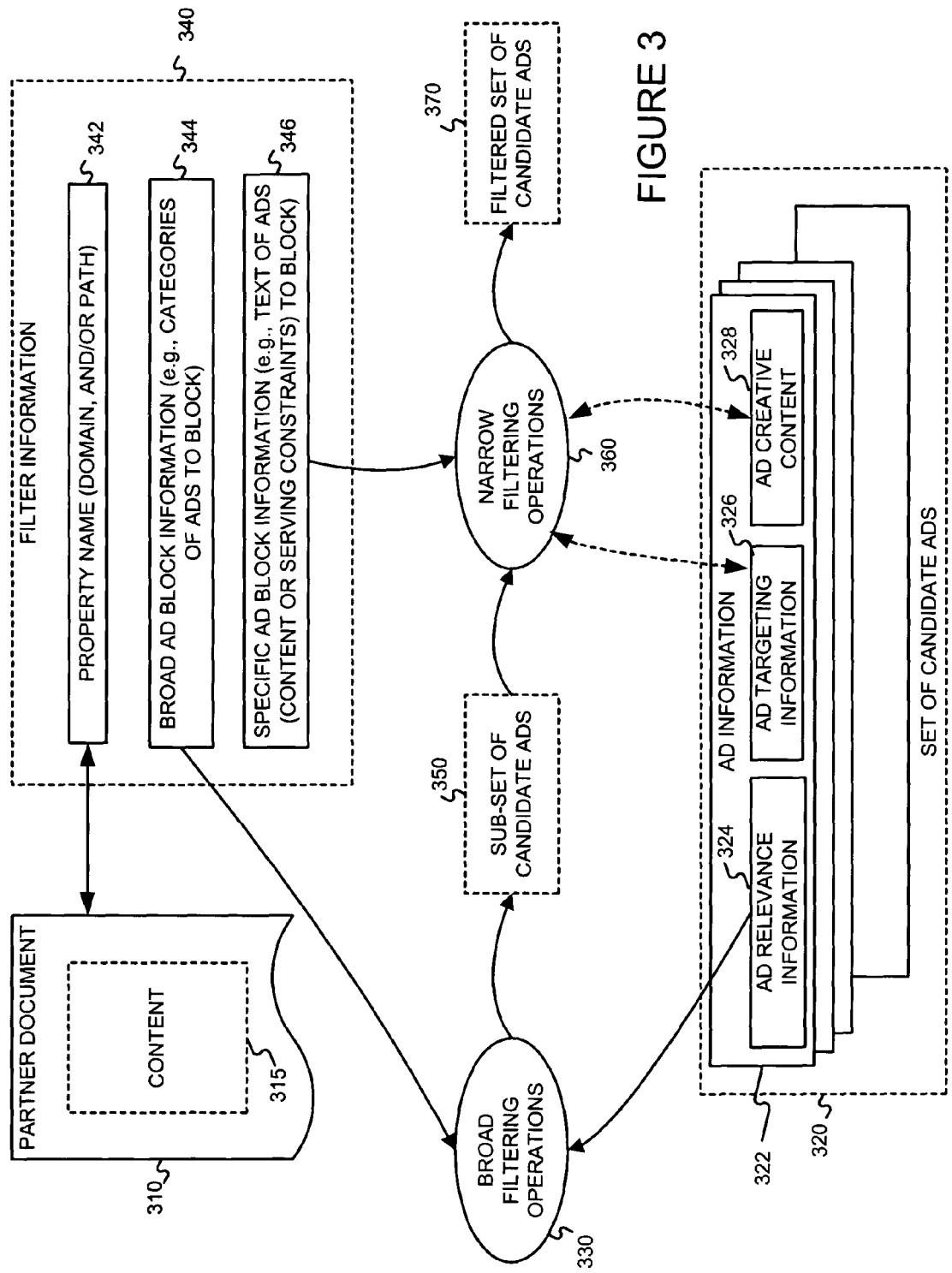
FIG. 3 is a bubble diagram of a first embodiment in which a set of candidate ads is filtered in a manner consistent with the present invention.

FIG. 3 is a bubble diagram of a first embodiment in which a set of candidate ads is filtered in a manner consistent with the present invention. A partner document (e.g., a Web page) 310 includes content 315. A content targeted ad server (not shown) may be used to generate a set 320 of candidate ads. Each of the ads may include ad information 322. The ad information 322 may include one or more of ad relevance information 324, ad targeting information 326 and ad creative content 328. The ad information 322 may also include a link (not shown) to a landing page. The ad relevance information 324 may include one or more semantic clusters, such as probabilistic hierarchical inferential learner (PHIL) clusters (See Provisional Application Ser. No. 60/416,144 (incorporated herein by reference), titled "METHODS AND APPARATUS FOR PROBABILISTIC HIERARCHICAL INFERENTIAL LEARNER," filed on Oct. 30, 2002 and listing Georges Harik and Noam Shazeer as inventors.), for example. A "semantic cluster" may be a collection or group of words or symbols having some relationship. For example, documents (or even search queries, or sentences, or passages, etc.) with the word "car" may often include the terms "lease," "dealer," "new," "used," and "previously owned." Therefore, these terms may be included in (at least one) given semantic cluster. The ad relevance information may have been specified, and/or may have been determined from ad creative content, content of the landing page, etc.

Filter information 340 may include a property name 342, broad ad block information 344, and/or specific ad block information 346. The property name 342 is used to identify one or more documents (e.g., Web pages) with which the broad and/or specific ad block information is to be used. The property name 342 may identify an entire domain (e.g., an entire Website), a path (e.g., a URL of a particular Web page), etc. The broad ad block information 344 may include categories of ads to block when a document covered by the specified property 342 is served. The specific ad block information 346 may include terms (i.e., words and/or phrases) which, if found in an ad, blocks the serving of the ad with a document covered by the specified property 342. Exemplary data structures for storing the filter information 340 are described in §4.2.2 below.

Broad filtering operations 330 may use broad ad block information 344 and ad relevance information 324 to generate a sub-set 350 of candidate ads from the initial set 320 of candidate ads. Narrow filtering operations 360 may use specific ad block information 346 and ad targeting information 326, ad creative content 328 and/or landing page content (not shown) to generate a filtered set 370 of candidate ads from the sub-set 350 of candidate ads. Exemplary methods and apparatus for performing broad filtering operations 330 and narrow filtering operations 360 are described in §4.2.1 below.

Figure 4:
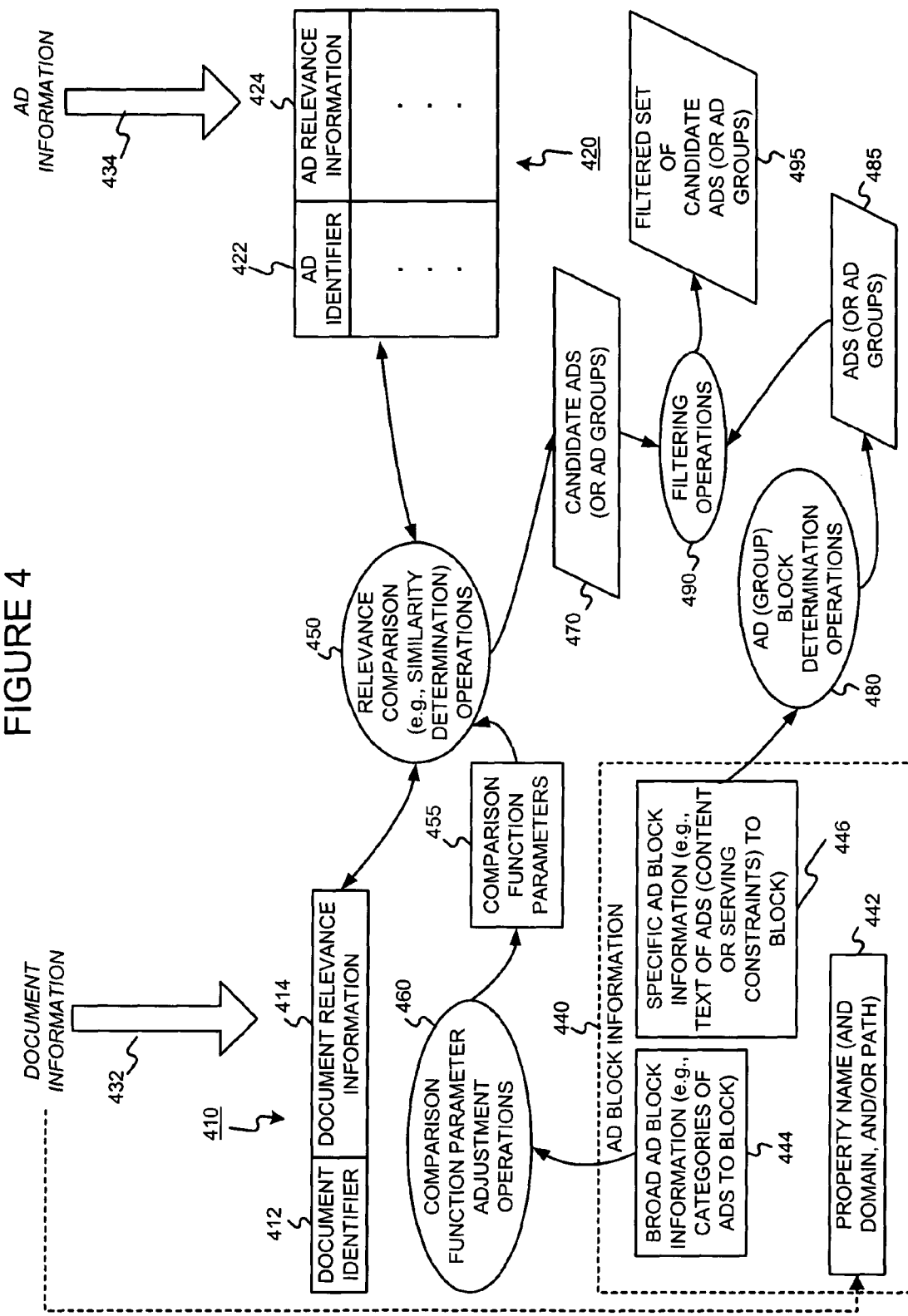
FIG. 4 is a bubble diagram of a second embodiment which blocks ads in a manner consistent with the present invention.

FIG. 4 is a bubble diagram of a second embodiment in which blocks and filters ads in a manner consistent with the present invention. Similar to the block information 340 of FIG. 3, block information 440 may include a property name 442, broad ad block information 444, and/or specific ad block information 446. The property name 442 is used to identify one or more documents (e.g., Web pages) with which the broad and/or specific ad block information is to be used. The property name 442 may identify an entire domain, a path, etc. The broad ad block information 444 may include categories of ads to block when a document covered by the specified property 442 is served. The specific ad block information 446 may include words and/or phrases which, if found in an ad, blocks the serving of the ad with a document covered by the specified property 442. Exemplary data structures for storing the filter information 440 are described in §4.2.2 below.

Relevance comparison operations 450 may be used to determine candidate ads 470 using document relevance information 414 and ad relevance information 424 for various ads. The document relevance information 414 and ad relevance information 424 may have been extracted or generated from document information 432 and ad information 434, respectively. The relevance comparison operations 450 may use one or more comparison functions. The comparison functions may use tunable parameters 455. Comparison function parameter adjustment operations 460 may adjust comparison function parameters 455 using, at least, broad ad block information 444. Filtering operations 490 may generate a filtered set 495 of candidate ads (or ad groups) from the candidate ads (or ad groups) 470 using, at least, ads (or ad groups) 485. The ads (or ad groups) 485 may be determined by ad (or ad group) block determination operations 480 using, at least, specific ad block information 446. Exemplary methods and apparatus for performing comparison function parameter adjustment operations 460, ad (group) block determination operations 480, and filtering operations 490 are described in §4.2.1 below.

Referring back to both FIGS. 3 and 4, although both broad and specific ad blocking are illustrated as being used together, either could be used without the other.

§4.2.1 Exemplary Methods

Figure 5:
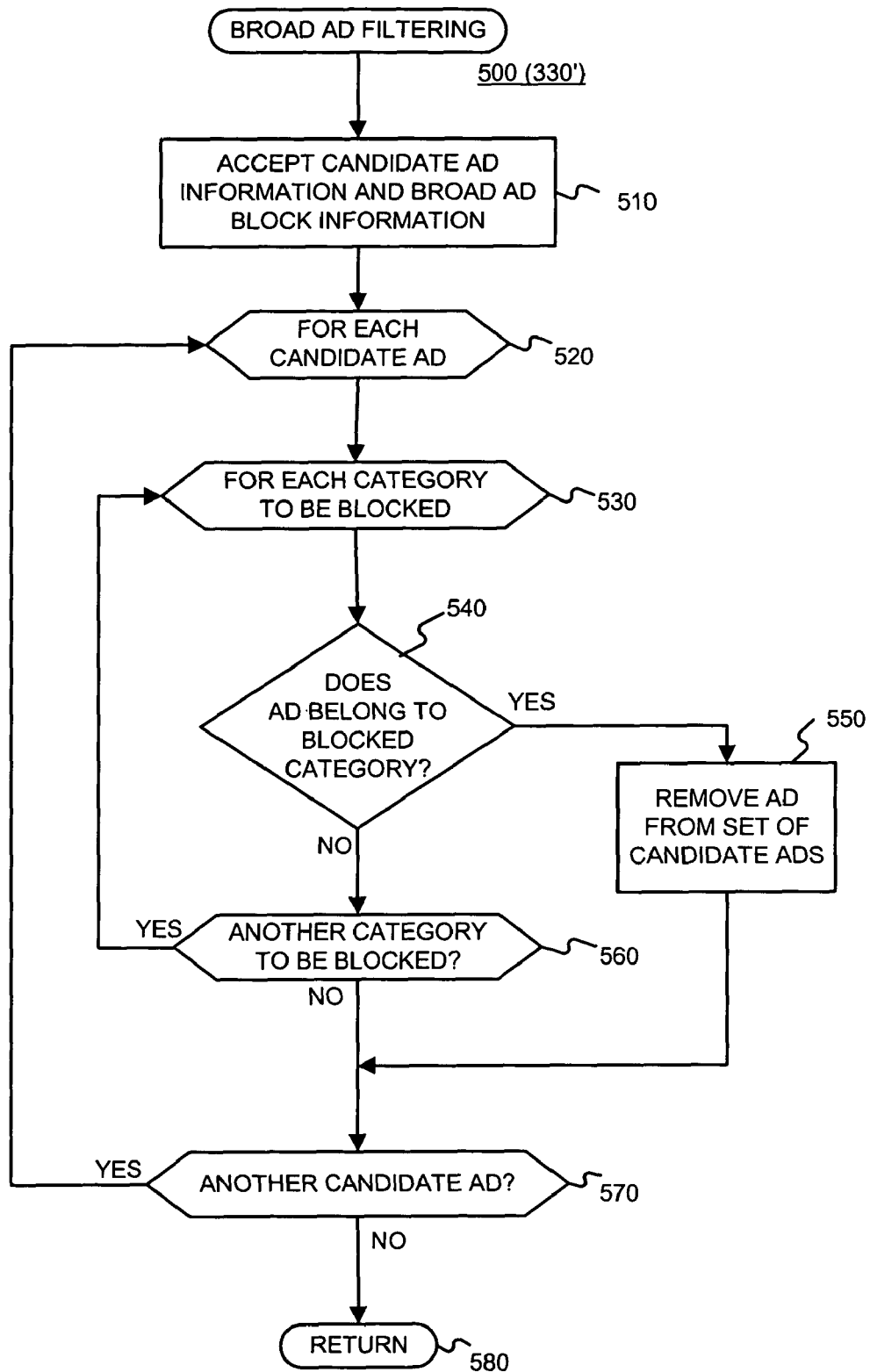
FIG. 5 is a flow diagram of an exemplary method 500 for performing broad ad filtering in a manner consistent with the present invention.

FIG. 5 is a flow diagram of an exemplary method 500 for performing broad ad filtering (Recall, e.g., operation 330 of FIG. 3.) in a manner consistent with the present invention. Candidate ad information and broad ad block information is accepted. (Block 510) Recall that broad ad block information may include categories of ads to block. A number of acts are performed for each candidate ad (or until a number of ads are accepted) as indicated by loop 520-570. As indicated by loop 530-560, for each category to be blocked, it is determined whether or not the candidate ad belongs to the blocked category. (Decision block 540). If so, the ad is removed from the set of candidate ads (or not added to a next set of ads) (Block 550), before the method 500 continues to process a next candidate ad. Once all candidate ads have been processed, the method 500 is left. (Node 580).

In an alternative to method 500, ads can be grouped in accordance with the categories to which they belong. A given ad could belong to more than one category group. If a category group corresponds to a blocked category, all ads belonging to that category group would be removed. In an alternative to method 500, decision block 540 determines whether or not an ad belongs to a predetermined number (e.g., 1-3) of blocked categories before it is blocked.

Figure 6:
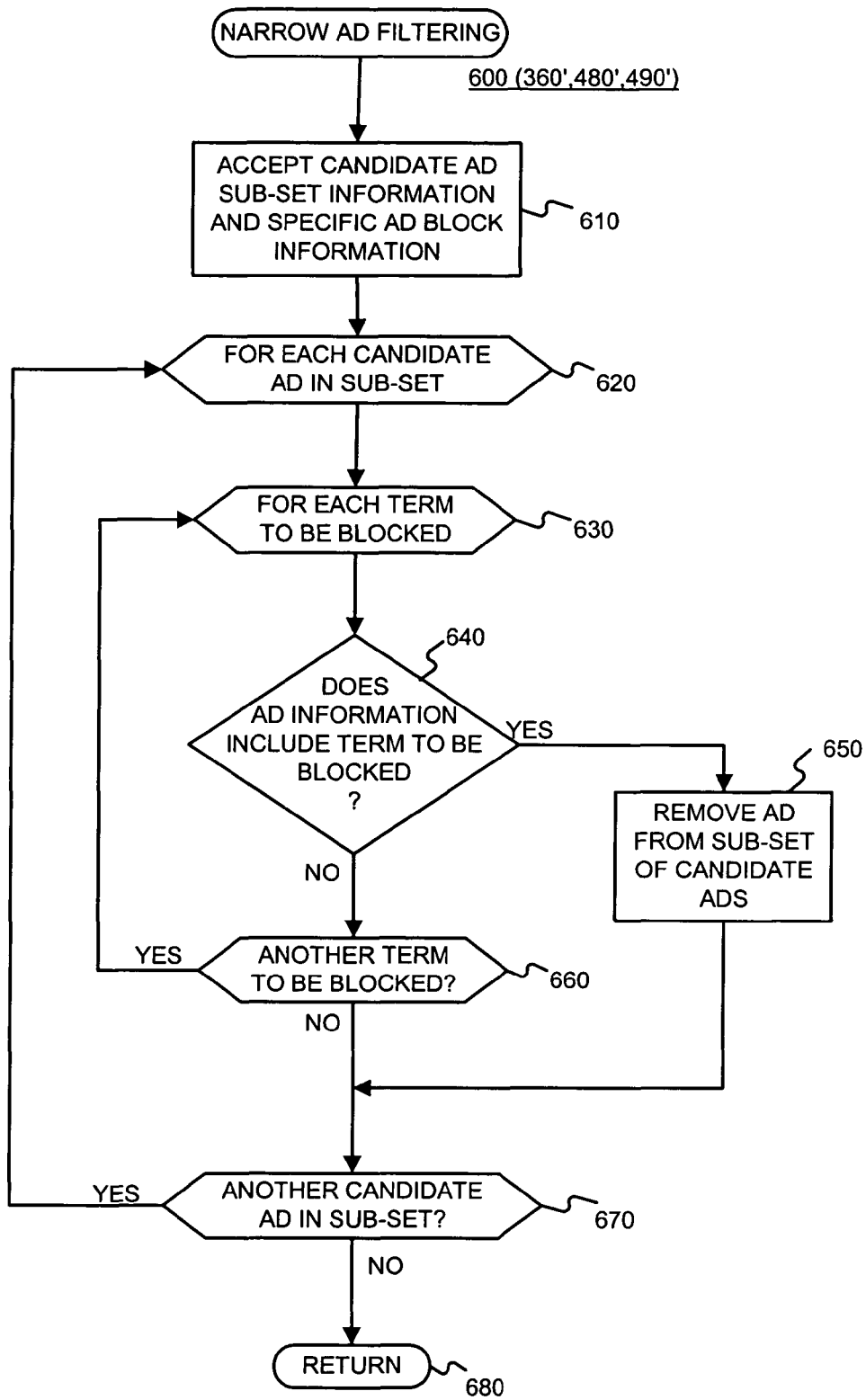
FIG. 6 is a flow diagram of an exemplary method 600 for performing narrow ad filtering in a manner consistent with the present invention.

FIG. 6 is a flow diagram of an exemplary method 600 for performing narrow ad filtering (Recall, e.g., operations 360, 480 and 490 of FIGS. 3 and 4.) in a manner consistent with the present invention. Candidate ad sub-set information and specific ad block information is accepted. (Block 610) Recall that specific ad block information may include specific terms. As indicated by loop 620-670, a number of acts are performed for each candidate ad. As indicated by loop 630-660, for each term to be blocked, it is determined whether ad information (or a particular part or parts of ad information) includes the term to be blocked. (Decision block 640) If so, the ad is removed from the sub-set of candidate ads (or not added to a next set of ads) (Block 650), before the method 600 continues to process a next candidate ad. Once all candidate ads have been processed, the method 600 is left. (Node 680). Referring back to decision block 640 ad information may include one or more of: (i) serving constraints such as targeting keywords; (ii) ad creative content, (iii) landing page content, etc.

In an alternative to method 600, the decision block 640 may determine whether the term to be blocked is used at least a predetermined number of times in the ad information.

Figure 7:
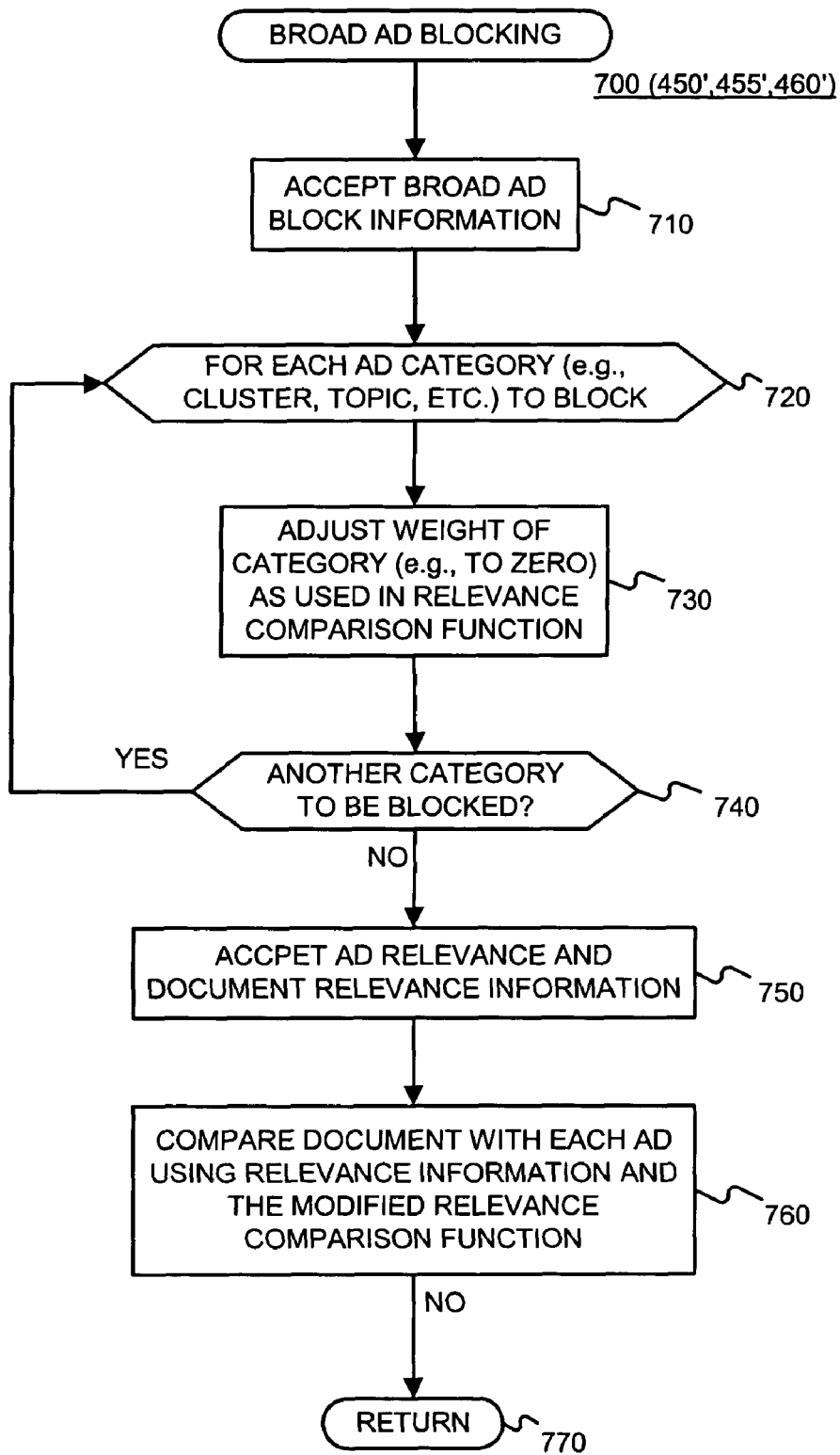
FIG. 7 is a flow diagram of an exemplary method 700 for performing broad ad blocking in a manner consistent with the present invention.

FIG. 7 is a flow diagram of an exemplary method 700 for performing broad ad blocking (Recall, e.g., 450, 455 and 460 of FIG. 4.) in a manner consistent with the present invention. Broad ad block information is accepted. (Block 710) As indicated by loop 720-740, for each ad category to block, the weight of the category used in a relevance comparison function is adjusted (e.g., to zero). (Block 730). The ad relevance and document relevance information are accepted (Block 750) and the document is compared with each ad using the relevance information and the modified relevance comparison function (Block 760) before the method 700 is left (Node 770). In one embodiment, the document-ad relevance comparison generates a similarity measure.

§4.2.2 Exemplary Data Structures

The ad blocking information 340, 440 may be referred to as "catlists." Catlists can be specified for each new ad category that needs to be blocked for a particular property. It may contain the following information, perhaps in a text file:

Property name (e.g., "ca-wunderground")

Domain and/or path restriction (e.g., http://www.wunderground.com/US/CA) (optional)

"Broad" terms relevant to the category of ads that will be blocked. For example, if a popular Website has an exclusive advertising arrangement with Phillips for consumer electronics, the broad terms might include "electronics" or "appliances" or "electric razors". The broad terms may specify a minimum number of broad terms that need to match before an ad is blocked. Alternatively, a partner could simply specify an objectionable ad or an objectionable Web page or Website from which category information, and therefore broad terms, could be derived.

"Specific" terms relevant to the text (e.g., creative text, keyword targeting criteria, etc.) of an ad that should be blocked. For example, to block ads for Sony televisions, the specific terms might include "sony televisions", "sony wega", "sony hdtv", etc. Ads with creative text, keyword targeting criteria, and/or landing page text, etc. that contain these terms would be blocked. The specific terms may specify a minimum number of specific terms that need to match before an ad is blocked.

The catlists may be entered into a text representation (e.g., a file) containing a list of catlist entries.

In one embodiment of the present invention, this text file may be provided to an application which may parse the above information and generate a data structure that associates (e.g., maps) the properties/domains with semantic clusters (e.g., PHIL clusters) for "broad" terms and associates the properties/domains with ads (or ad groups) for "specific" terms, to generate semantic clusters of ads, as well as ads (or ad groups) that should be blocked. The content-targeted ad server may load this data structure into memory. The data structure (which could be XML in an alternative embodiment) may look something like the following:

```
parsed message CatlistTable {
    repeated group Entry {
        required string property;
        optional string url_restriction;
        repeated int blocked_cluster_ids;
        repeated int blocked_adgroup_ids;
    }
}
```

In a more general embodiment, the cluster_ids may be any concept identifier. Similarly, in a more general embodiment, the adgroup_ids may be any ad identifier. Ads may be blocked at run time. For example, the file containing this data structure may be passed to the a content-targeted ad server, which may load it into a data structure at startup (or whenever that file is changed). This data structure may be keyed off the property and url_restriction. For example, during an ads matching phase, the content-relevant ad server may reduce the weight of semantic (e.g., PHIL) clusters that are in blocked_cluster_ids to zero. The remaining clusters may then used to generate a list of ads (or ad groups) applicable to the document. If an ad has (or if an ad group includes an ad that has) creative text, keyword targeting criteria, etc. matching the "specific" terms then it will be removed from consideration.

For example, the content-targeting ad server may scan remaining ads (or ad groups) and remove those with ids are in blocked_adgroup_ids.

§4.2.3 Exemplary Apparatus

Figure 11:
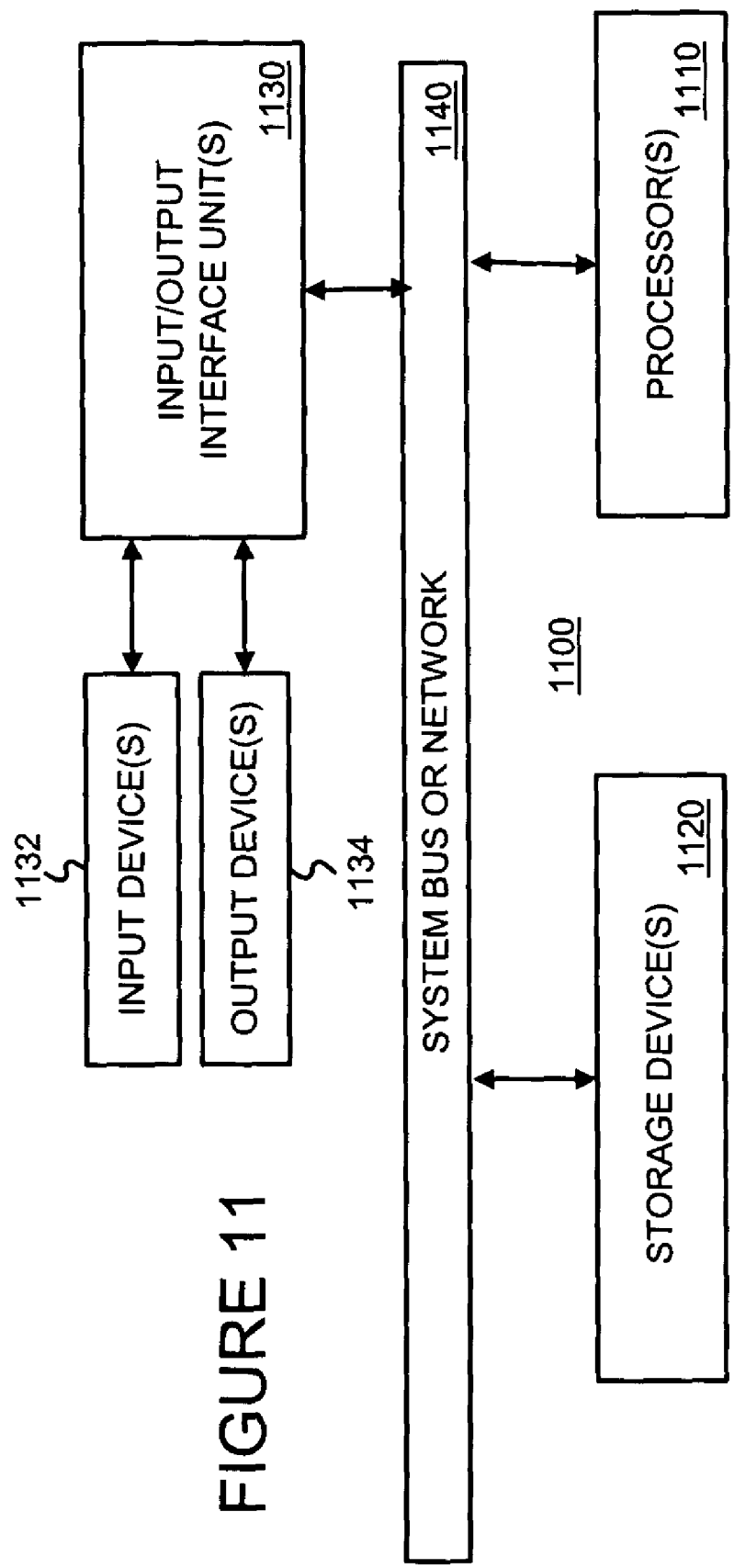
FIG. 11 is a block diagram of an exemplary apparatus that may perform various operations in a manner consistent with the present invention.

FIG. 11 is high-level block diagram of a machine 1100 that may perform one or more of the operations discussed above. The machine 1100 basically includes one or more processors 1110, one or more input/output interface units 1130, one or more storage devices 1120, and one or more system buses and/or networks 1140 for facilitating the communication of information among the coupled elements. One or more input devices 1132 and one or more output devices 1134 may be coupled with the one or more input/output interfaces 1130.

The one or more processors 1110 may execute machine-executable instructions (e.g., C or C++ running on the Solaris operating system available from Sun Microsystems Inc. of Palo Alto, Calif. or the Linux operating system widely available from a number of vendors such as Red Hat, Inc. of Durham, N.C.) to effect one or more aspects of the present invention. At least a portion of the machine executable instructions may be stored (temporarily or more permanently) on the one or more storage devices 1120 and/or may be received from an external source via one or more input interface units 1130.

In one embodiment, the machine 1100 may be one or more conventional personal computers. In this case, the processing units 1110 may be one or more microprocessors. The bus 1140 may include a system bus. The storage devices 1120 may include system memory, such as read only memory (ROM) and/or random access memory (RAM). The storage devices 1120 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

A user may enter commands and information into the personal computer through input devices 1132, such as a keyboard and pointing device (e.g., a mouse) for example. Other input devices such as a microphone, a joystick, a game pad, a satellite dish, a scanner, or the like, may also (or alternatively) be included. These and other input devices are often connected to the processing unit(s) 1110 through an appropriate interface 1130 coupled to the system bus 1140. The output devices 1134 may include a monitor or other type of display device, which may also be connected to the system bus 1140 via an appropriate interface. In addition to (or instead of) the monitor, the personal computer may include other (peripheral) output devices (not shown), such as speakers and printers for example.

§4.2.4 Alternatives

The above mechanism could also be to automatically support "channels" in search-based targeting. For example, a partner may buy up an entire category such as "flowers" and the above system can be used to automatically restrict advertisers who buy related keywords such as "tulips" or "violets."

§4.3 Illustrative Examples of Operations of Exemplary Embodiments

Figure 8:
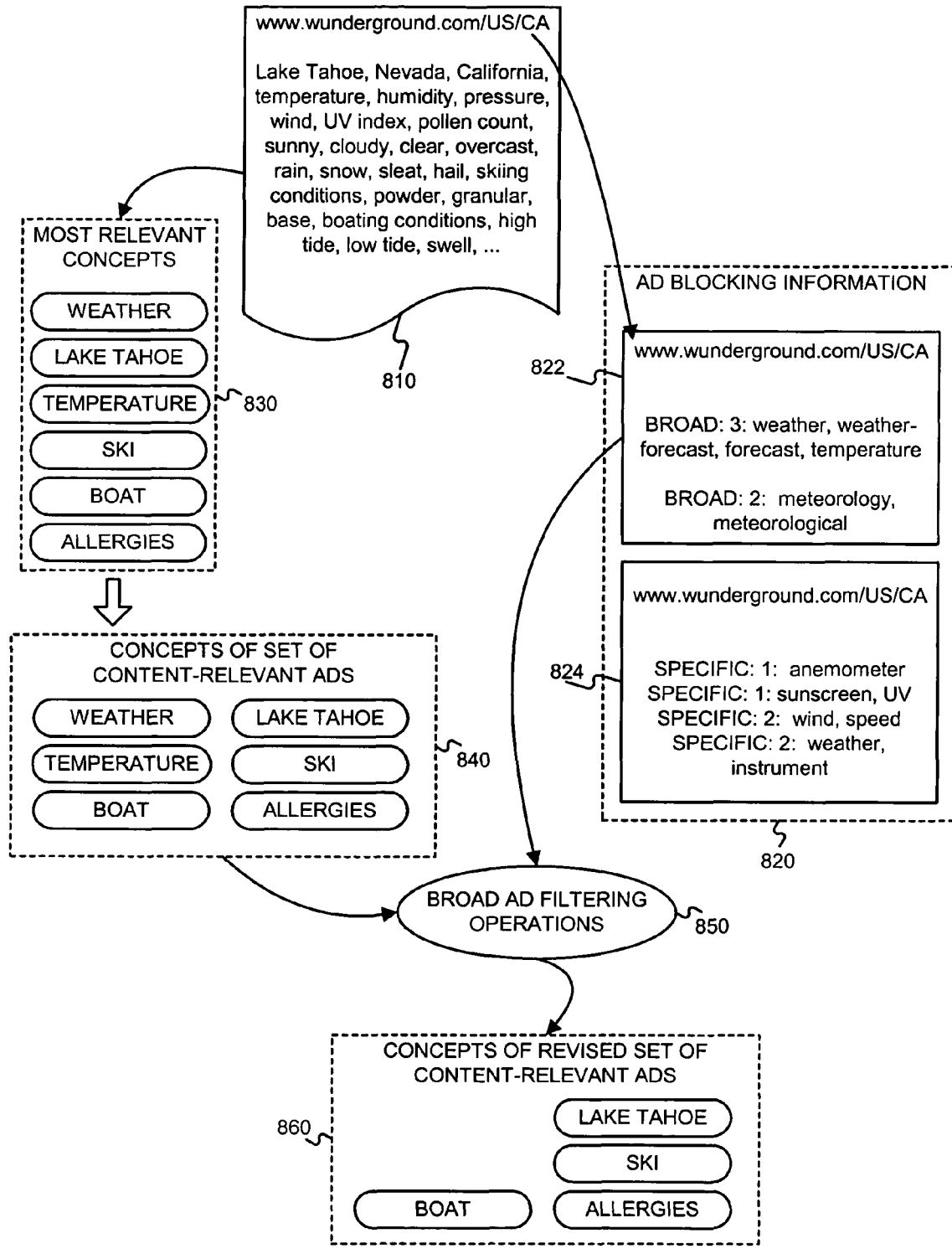
FIG. 8 illustrates an application of a broad ad filtering technique that is consistent with the present invention.

Examples of broad ad blocking using two different embodiments of the present invention are described with reference to FIGS. 8 and 9. Then, an example of specific ad blocking is described with reference to FIG. 10. In this example, assume that weather ads are to be blocked for www-.wunderground.com pages that are for cities in California. Further, assume that the property has an exclusive advertising relationship with Coppertone for sunblock and suntan lotion.

Ad blocking information may be defined as follows (where the pound sign "#" indicates a comment line):
Begin
Property name
property: ca-wunderground
domain or path restriction (ads will be blocked only for docs with this URL prefix)
urlrestriction: http://www.wunderground.com/US/CA
"Broad terms"
broad:<threshold>:<words>repeated
words—words relevant to the category of ads that need to be blocked
threshold—number of matches of words in a phil cluster with words
in words before the cluster is no longer used to determine what ads
will be shown
broad: 3: weather weather-forecast forecast temperature
broad: 2: meteorology meteorological
"Specific terms"
specific:<threshold>:<words>repeated
words—words relevant to specific text within ads that need to be blocked
threshold—number of matches of words in ad creative or criteria text with words
in words before the ad group containing the ad is no longer shown
specific: 1: anemometer
specific: 1: sunscreen, suntan, tan, UV
specific: 2: wind speed
specific: 2: weather instrument
End FIG. 8 illustrates an application of a broad ad filtering technique that is consistent with the present invention. The ad blocking information just discussed is shown as block 820, including the broad ad blocking information 822 and the specific ad blocking information 824. The Web page document 810 is associated with the blocking information 820. Notice that the Web page document 810 may include a number of terms and concepts. In this example, the terms or concepts may be related to the geographic region the weather is being reported on (e.g., Lake Tahoe, Nevada, California, etc.), weather (e.g., temperature, humidity, wind sunny, cloudy, clear, overcast, rain, snow, sleet, hail, etc.), outdoor conditions (e.g., UV index, pollen count, etc.) and conditions related to various outdoor activities (e.g., skiing conditions, powder, granular, base, boating conditions, high tide, low tide, swell, etc.). A number (which may be subject to a predetermined limit) of the most relevant concepts of the Web page document 810 may be extracted. As shown, in this example, the most relevant concepts 830 may include weather, lake tahoe, temperature, ski, boat, and allergies. A content-targeted ad server (such as those introduced in §1.2 above) generates a set of content-relevant ads, the concepts of which are depicted in block 840. Each of the ads may be associated with one or more of the concepts. Broad filtering operations 850 generate a revised set of content-relevant ads, the concepts of which are depicted in block 860, from the initial set of content-relevant ads using, at least, the broad ad blocking information 822. As shown, ads associated with the concepts weather or temperature have been removed from consideration.

Figure 9:
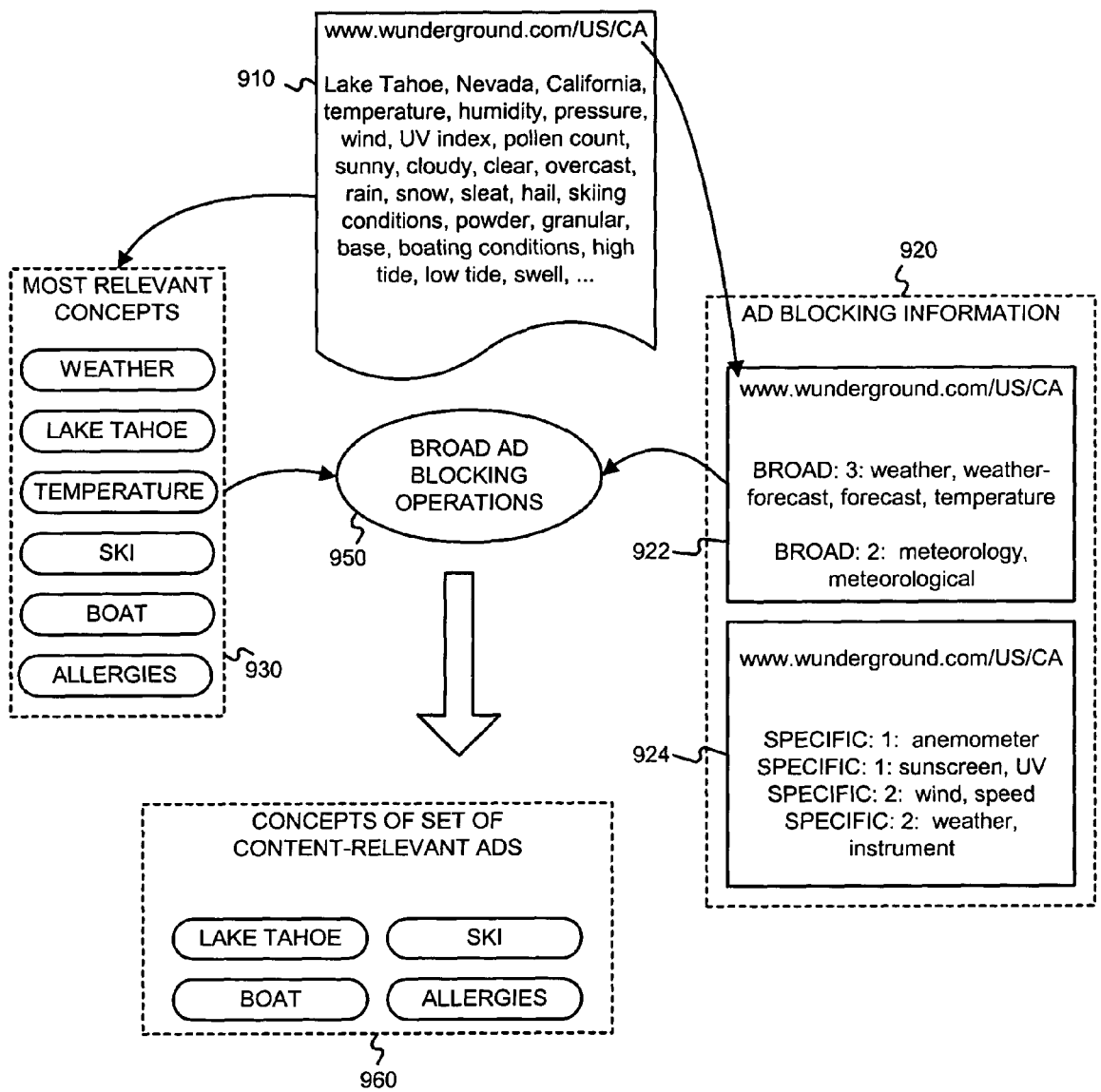
FIG. 9 illustrates an application of a broad ad blocking technique that is consistent with the present invention.

FIG. 9 illustrates an application of a broad ad blocking technique that is consistent with the present invention. As was the case with the embodiment exemplified in FIG. 8, the ad blocking information 920 includes the broad ad blocking information 922 and the specific ad blocking information

924. The Web page document 910 is associated with the blocking information 920 and may include a number of terms and concepts. A number (which may be subject to a predetermined limit) of the most relevant concepts 930 of the Web page document 910 may be extracted. Broad ad filtering operations 950 may modify a comparison part (not shown) of a content-targeted ad server (such as those introduced in §1.2 above) using, at least, the broad ad blocking information 922. The content-targeted ad server may then generate a set of content-relevant ads, the concepts of which are depicted in block 960, where ads associated with the concepts weather or temperature have been removed from consideration.

Figure 10:
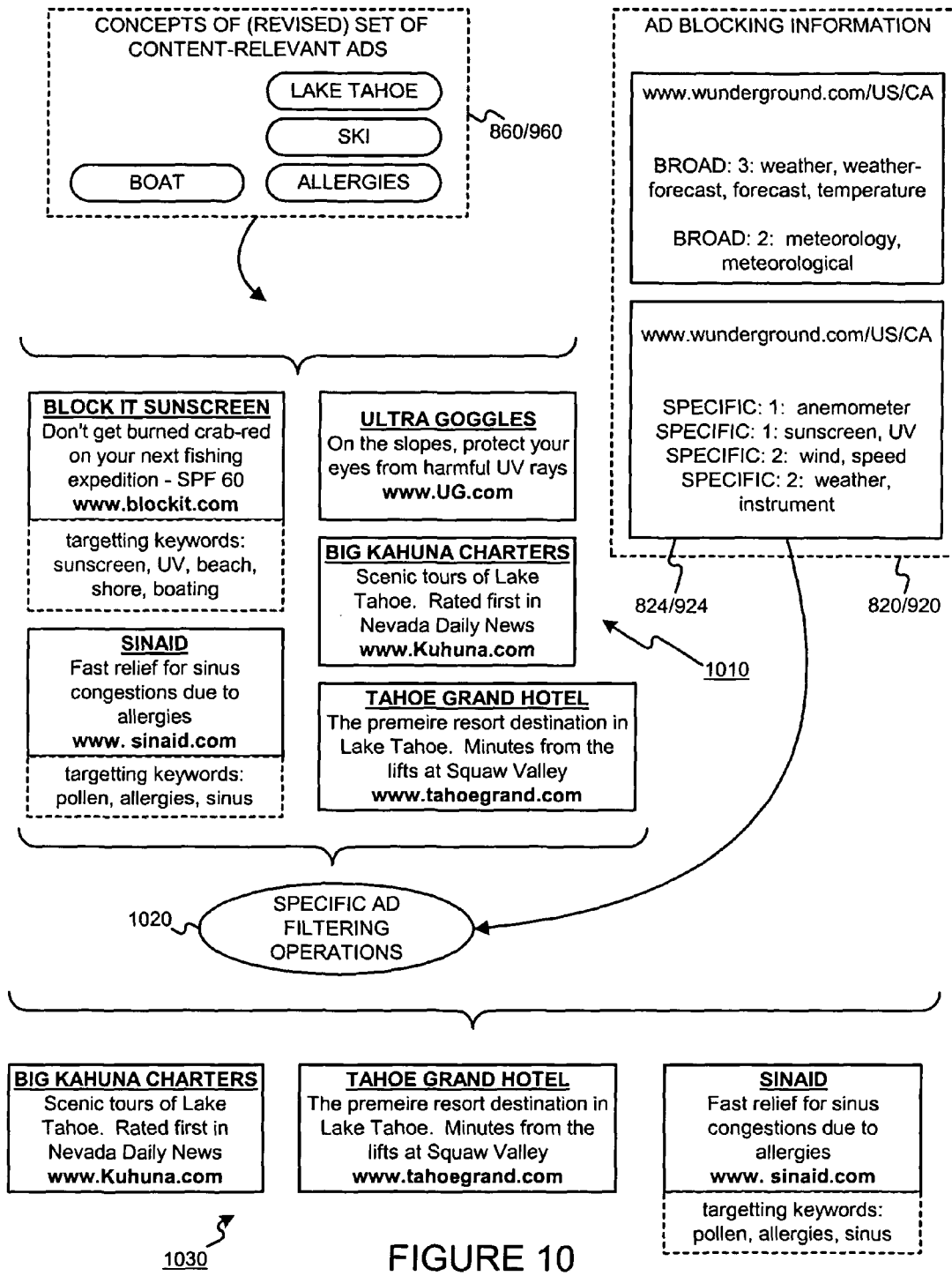
FIG. 10 illustrates an application of a specific ad filtering technique that is consistent with the present invention.

FIG. 10 illustrates an application of a specific ad filtering technique that is consistent with the present invention. A revised set of content-relevant ads, the concepts of which are depicted in block 860/960, may include a number of ads, such as text ads 1010. The specific ad filtering operations 1020 may filter these ads 1010, using at least the terms specified by the specific ad blocking information 824/924, to generate a reduced set 1030 of ads. Notice that the "block it sunscreen" ad was blocked because its creative text included the term "sunscreen," and because its targeting keywords included the terms "sunscreen" and "UV." The "ultra goggles" ad was also blocked because its creative included the term "UV."

§4.4 Conclusions

In view of the foregoing, the present invention teaches improved ad blocking techniques. Such techniques (i) are easy to set up, (ii) are easy to manage, (iii) avoid under-inclusion, and/or (iv) avoid over-inclusion. These techniques work well with content-targeting ad serving systems. The present invention may be used to fine tune the ad blocking depending on course, and/or fine grain category definitions (e.g. course: car sales, fine: new car sales). Finally, the blocking can occur at either the property level (e.g. Yahoo) the domain level (e.g. shopping.yahoo.com), or the path level (e.g. shopping.yahoo.com/flowers). Various aspect of the present invention may be used alone, together, and/or together without ad blocking techniques.

What is claimed is:

1. A computer-implemented method for blocking advertisements, the method comprising:
   referencing a primary advertisement within a web page;
   identifying, based on referencing the primary advertisement within the web page, at least one blocking category of advertisements to be blocked and one or more terms that are relevant to the at least one blocking category;
   accepting at least one advertisement as a candidate for a secondary advertisement within the web page that features the primary advertisement, with each accepted advertisement being configured to be embedded in the web page and being provided by an advertising server;
   storing the at least one accepted advertisement on the advertising server for consideration in a list of candidates for the secondary advertisement;
   identifying a document to which the at least one accepted advertisement is linked, the document representing a landing page related to the at least one accepted advertisement;
   analyzing, via a processor, content in the document to identify one or more terms in the document;
   comparing the one or more terms in the document to the one or more terms that are relevant to the at least one blocking category;
   identifying, based on the comparing, whether the at least one accepted advertisement is in one or more of the at least one blocking category;
   using the at least one blocking category of advertisements to be blocked to develop the list of the candidates for the secondary advertisement replacement with the primary advertisement, the candidates being selected from the at least one accepted advertisement for the secondary advertisement; and
   preventing the at least one accepted advertisement from being included in the list of candidates if the at least one accepted advertisement is in one or more of the at least one blocking category of advertisements to be blocked.

2. The method of claim 1, wherein preventing comprises removing the at least one accepted advertisement from the list of candidates.

3. The method of claim 1, wherein at least one of the at least one blocking category comprises a category of advertisements for products to be blocked.

4. The method of claim 1, wherein at least one of the at least one blocking category comprises a category of advertisements for services to be blocked.

5. The method of claim 1, wherein the at least one blocking category of advertisements to be blocked is accepted from a list associated with at least one document.

6. The method of claim 5, wherein the at least one document comprises at least one web page.

7. The method of claim 5, wherein the at least one document comprises web pages of a website.

8. The method of claim 5, wherein the at least one document comprises at least one web page associated with a path name.

9. The method of claim 1, further comprising:
   comparing advertisement information for the at least one accepted advertisement to the one or more terms that are relevant to the at least one blocking category; and
   preventing the at least one accepted advertisement from being served if at least a part of the advertisement information includes one or more of the one or more terms that are relevant to the at least one blocking category.

10. The method of claim 9, wherein the at least the part of the advertisement information comprises content of a creative of the at least one accepted advertisement.

11. The method of claim 9, wherein the at least the part of the advertisement information comprises keyword targeting terms associated with the at least one accepted advertisement.

12. The method of claim 9, wherein the advertisement information comprises a product name.

13. The method of claim 9, wherein the advertisement information comprises a name of a product manufacturer.

14. The method of claim 9, wherein the advertisement information comprises a name of a product retailer.

15. The method of claim 9, wherein the advertisement information comprises a service name.

16. The method of claim 9, wherein the advertisement information comprises a name of a service provider.

17. The method of claim 9, wherein the advertisement information is associated with at least one document.

18. The method of claim 17, wherein the at least one document comprises at least one web page.

19. The method of claim 17, wherein the at least one document comprises web pages of a website.

20. The method of claim 17, wherein the at least one document comprises at least one web page associated with a path name.

21. An apparatus for blocking advertisements, the apparatus comprising:
one or more processors; and
one or more machine-readable media configured to store instructions that are executable by the one or more processors to perform operations comprising:
accepting at least one blocking category of advertisements to be blocked within a web page and one or more terms that are relevant to the at least one blocking category, with the web page for presentation of a primary advertisement;
accepting at least one advertisement as a candidate for a secondary advertisement within the web page that features the primary advertisement, with each accepted advertisement being configured to be embedded in a web page and being provided by an advertising server;
identifying a document to which the at least one accepted advertisement is linked, the document representing a landing page related to the at least one accepted advertisement;
storing the at least one accepted advertisement on the advertising server for consideration in a list of candidates for the secondary advertisement;
analyzing content in the document to identify one or more terms in the document;
comparing the one or more terms in the document to the one or more terms that are relevant to the at least one blocking category;
identifying, based on the comparing, whether the at least one accepted advertisement is in one or more of the at least one blocking category;
using the at least one blocking category of advertisements to be blocked to develop the list of the candidates for the secondary advertisement for placement with the primary advertisement, the candidates being selected from the at least one accepted advertisement for the secondary advertisement; and
preventing the at least one accepted advertisement from being included in the list of candidates if the at least one accepted advertisement is in one or more of the at least one blocking category of advertisements to be blocked.

22. The apparatus of claim 21, wherein preventing comprises removing the at least one accepted advertisement from the list of candidates.

23. The apparatus of claim 21, wherein at least one of the at least one blocking category comprises a category of advertisements for products to be blocked.

24. The apparatus of claim 21, wherein at least one of the at least one blocking category comprises a category of advertisements for services to be blocked.

25. The apparatus of claim 21, wherein the at least one blocking category of advertisements to be blocked is accepted from a list associated with at least one document.

26. The apparatus of claim 25, wherein the at least one document comprises at least one web page.

27. The apparatus of claim 25, wherein the at least one document comprises web pages of a website.

28. The apparatus of claim 25, wherein the at least one document comprises at least one web page associated with a path name.

29. The apparatus of claim 21, wherein the operations further comprise:
comparing advertisement information for the at least one accepted advertisement to the one or more terms that are relevant to the at least one blocking category; and
preventing the at least one accepted advertisement from being served if at least a part of the advertisement information includes one or more of the one or more terms that are relevant to the at least one blocking category.

30. The apparatus of claim 29, wherein the at least the part of the advertisement information comprises content of a creative of the at least one accepted advertisement.

31. The apparatus of claim 29, wherein the at least the part of the advertisement information comprises keyword targeting terms associated with the at least one accepted advertisement.

32. The apparatus of claim 29, wherein the advertisement information comprises a product name.

33. The apparatus of claim 29, wherein the advertisement information comprises a name of a product manufacturer.

34. The apparatus of claim 29, wherein the advertisement information comprises a name of a product retailer.

35. The apparatus of claim 29, wherein the advertisement information comprises a service name.

36. The apparatus of claim 29, wherein the advertisement information comprises a name of a service provider.

37. The apparatus of claim 29, wherein the advertisement information is associated with at least one document.

38. The apparatus of claim 37, wherein the at least one document comprises at least one web page.

39. The apparatus of claim 37, wherein the at least one document comprises web pages of a website.

40. The apparatus of claim 37, wherein the at least one document comprises at least one web page associated with a path name.

41. A computer-readable medium configured to store instructions that are executable by one or more processors to perform operations comprising:
receiving at least one blocking category of advertisements to be blocked in a web page and one or more terms that are relevant to the at least one blocking category, with the web page for presentation of a primary advertisement;
accepting at least one advertisement as a candidate for a secondary advertisement within the web page that features the primary advertisement;
identifying a document to which the at least one accepted advertisement is linked, the document representing a landing page related to the at least one accepted advertisement;
analyzing content in the document to identify one or more terms in the document;
comparing the one or more terms in the document to the one or more terms that are relevant to the at least one blocking category;
identifying, based on the comparing, whether the at least one accepted advertisement is in one or more of the at least one blocking category; and
using the at least one blocking category of advertisements to be blocked to develop a list of candidates for the secondary advertisement for placement with the primary advertisement, the candidates being selected from the at least one accepted advertisement;
preventing the at least one accepted advertisement from being included in the list of candidates if the at least one accepted advertisement is in one or more of the at least one blocking category of advertisements to be blocked.

42. The computer-readable medium of claim 41, wherein preventing comprises removing the at least one accepted advertisement from the list of candidates.

43. The computer-readable medium of claim 41, wherein at least one of the at least one blocking category comprises a category of advertisements for products to be blocked.

44. The computer-readable medium of claim 41, wherein at least one of the at least one blocking category comprises a category of advertisements for services to be blocked.

45. The computer-readable medium of claim 41, wherein the at least one blocking category of advertisements to be blocked is accepted from a list associated with at least one document.

46. The computer-readable medium of claim 45, wherein the at least one document comprises at least one web page.

47. The computer-readable medium of claim 45, wherein the at least one document comprises web pages of a website.

48. The computer-readable medium of claim 45, wherein the at least one document comprises at least one web page associated with a path name.

49. The computer-readable medium of claim 41, wherein the operations further comprise:
  comparing advertisement information for the at least one accepted advertisement to the one or more terms that are relevant to the at least one blocking category; and
  preventing the at least one accepted advertisement from being served if at least a part of the advertisement information includes one or more of the one or more terms that are relevant to the at least one blocking category.

50. The computer-readable medium of claim 49, wherein the at least the part of the advertisement information comprises content of a creative of the at least one accepted advertisement.

51. The computer-readable medium of claim 49, wherein the at least the part of the advertisement information comprises keyword targeting terms associated with the at least one accepted advertisement.

52. The computer-readable medium of claim 49, wherein the advertisement information comprises a product name.

53. The computer-readable medium of claim 49, wherein the advertisement information comprises a name of a product manufacturer.

54. The computer-readable medium of claim 49, wherein the advertisement information comprises a name of a product retailer.

55. The computer-readable medium of claim 49, wherein the advertisement information comprises a service name.

56. The computer-readable medium of claim 49, wherein the advertisement information comprises a name of a service provider.

57. The computer-readable medium of claim 49, wherein the advertisement information is associated with at least one document.

58. The computer-readable medium of claim 57, wherein the at least one document comprises at least one web page.

59. The computer-readable medium of claim 57, wherein the at least one document comprises web pages of a website.

60. The computer-readable medium of claim 57, wherein the at least one document comprises at least one web page associated with a path name.

61. An apparatus comprising:
  means for accepting at least one blocking category of advertisements to be blocked within a web page and one or more terms that are relevant to the at least one blocking category, with the web page for presentation of a primary advertisement;
  means for accepting at least one advertisement as a candidate for a secondary advertisement within the web page that features the primary advertisement, with each accepted advertisement being configured to be embedded in a web page and being provided by an advertising server;
  means for identifying a document to which the at least one accepted advertisement is linked, the document representing a landing page related to the at least one accepted advertisement;
  means for storing the at least one accepted advertisement on the advertising server for consideration in a list of candidates for the secondary advertisement;
  means for analyzing content in the document to identify one or more terms in the document;
  means for comparing the one or more terms in the document to the one or more terms that are relevant to the at least one blocking category;
  means for identifying, based on the comparing, whether the at least one accepted advertisement is in one or more of the at least one blocking category;
  means for using the at least one blocking category of advertisements to be blocked to develop the list of the candidates for the secondary advertisement for placement with the primary advertisement, the candidates being selected from the at least one accepted advertisement for the secondary advertisement; and
  means for preventing the at least one accepted advertisement from being included in the list of candidates if the at least one accepted advertisement is in one or more of the at least one blocking category of advertisements to be blocked.

62. A method implemented by one or more processors, comprising: identifying, based on a reference to a first advertisement in a web page, a category of advertisements to be blocked and one or more terms that are relevant to the category of advertisements to be blocked;
  accepting a second advertisement as a candidate for placement in the web page that displays the first advertisement;
  accessing a landing page of the second advertisement;
  comparing, via a processor, one or more terms in the landing page to the one or more terms that are relevant to the category of advertisements to be blocked;
  identifying, based on the comparing, whether the second advertisement is in the category of advertisements to blocked;
  determining, based on identification of whether the second advertisement is in the category of advertisements to blocked, whether the second advertisement remains as the candidate for placement in the web page.

* * * * *